MULTIPLE SWITCH FOR ESTABLISHING A NUMBER OF SIMULTANEOUS CONNECTIONS BETWEEN TWO GROUPS OF CONDUCTOR SYSTEMS

Filed May 25, 1950 2 Sheets-Sheet 1

INVENTORS

DIRK BOTERWEG
FLORUS CORNELIS W. SLOOFF
BY
AGENT

INVENTORS.
DIRK BOTERWEG
FLORUS CORNELIS WILLEM SLOOFF
BY
Fred M Vogel
AGENT.

Patented July 27, 1954

2,685,010

UNITED STATES PATENT OFFICE 2,685,010

MULTIPLE SWITCH FOR ESTABLISHING A NUMBER OF SIMULTANEOUS CONNECTIONS BETWEEN TWO GROUPS OF CONDUCTOR SYSTEMS

Dirk Boterweg and Florus Cornelis Willem Slooff, Hilversum, Netherlands, assignors to Hartford National Bank and Trust Company, Hartford, Conn., as trustee Application May 25, 1950, Serial No. 164,088

Claims priority, application Netherlands July 7, 1949

5 Claims. (Cl. 200—92)

This invention relates to a multiple switch for establishing a number of simultaneous connections between two groups of conductor systems, one conductor system chosen from the first group being connected to one conductor system chosen from the second group constituting a single connection. The switch, which will be briefly termed a "multiple switch" throughout this specification, comprises a plurality of switch arms which are rotatable about a common axis of rotation and to each of which switch arms a conductor system of the first group is connected and which switch arms comprise one or more contact members adapted to co-operate with stationary contact members to each of which a conductor system of the second group is connected.

Switches of the aforesaid kind are used inter alia in radio receiving and transmitting systems, in which a plurality of transmitters and/or receivers are available, each of which is adapted to be connected to any one of a usually greater number of aerials. A known multiple switch used for this purpose comprises, in addition to switch arms to which the supply leads from the transmitter are connected, a number of switch arms connected to the supply leads for the aerials and rotatable about a common shaft which is at right angles to the rotary shaft of the first-mentioned switch arms. The stationary contacts with which the contacts of the two groups of switch arms are adapted to co-operate are pairwise connected electrically. For the interconnection of a definite transmitter and a definite aerial the switch arms, associated with the supply lead from the transmitter and with the supply lead for a given aerial respectively are turned to make the contacts of these arms co-operate with stationary contacts which are connected electrically.

The term "conductor system" is to be understood to mean that each system may consist of a number of, i. e. more than one, electrically separated conductors, but does not exclude a system consisting of a single electrical conductor. With aerial selector switches, a conductor system usually consists of two parallel supply leads. It will be evident that each switch arm carries, as a rule, a number of contacts corresponding to the number of electrically separated conductors in the conductor system connected to this arm.

The invention has for its object to provide a simply constructed multiple switch which occupies less space than those hitherto known.

According to the invention, a multiple switch for establishing a number of simultaneous connections between two groups of conductor systems, one conductor system chosen from the first group being connected to one conductor system chosen from the second group constituting a single connection, the switch comprising a number of rotatable switch arms having a common axis of rotation, to each of which switch arms a conductor system of the first group is connected and which comprises one or more contact members co-operating with stationary contact members to which conductor systems of the second group are connected, is characterized in that the stationary contacts are arranged in an arc of a circle, the plane of the circle is at right angles to the common axis of rotation of the switch arms, and the centre of the circle lies in this axis, the contacts supported by each switch arm being movable relatively to the switch arm so as to be retractable from the stationary contacts in the arc to occupy a position such that the switch arm, on rotating may freely pass the other switch arms.

The movable contacts may, for example, be supported by a contact support which is rotatable in a plane extending through the common axis of rotation of the switch arms and by means of which the contacts may be swung through a semicircle away from the stationary contacts.

The switch according to the invention has the advantage that only one group of switch arms is provided. Furthermore, the switch occupies little space, since the stationary contacts are arranged in a single arc and all the switch arms co-operate with the same row of stationary contacts.

The contacts carried by the switch arms are preferably rectilinearly movable such that the direction of displacement of each of the contact supports extends through the common axis of rotation of the switch arms, the angles included between the directions of displacement of the contacts of the switch arms and the said axis being different from one another.

In order that the invention may be more clearly understood and readily carried into effect, it will now be described more fully with reference to the accompanying diagramamtic drawings, given by way of example, in which.

Figure 1:
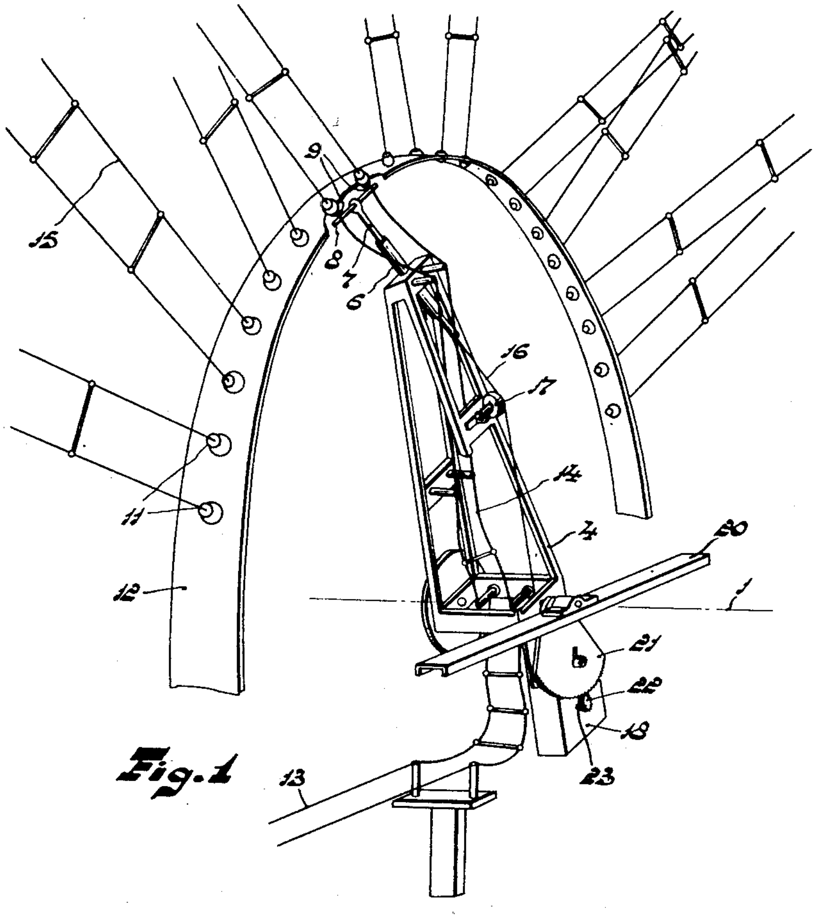
Fig. 1 is a perspective view of an antenna selector switch suitable for connecting each of four radio transmitters to any of ten aerials, only one of its four switch arms being shown.
Figure 2:
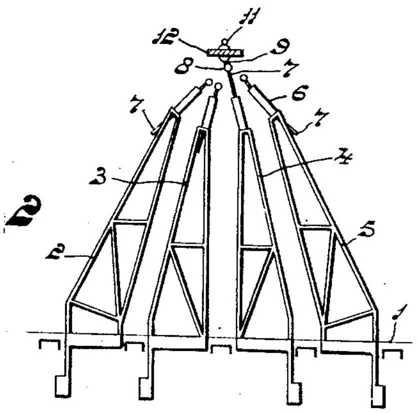
Fig. 2 is a vertical section of the switch, the four switch arms being turned into the same vertical plane to illustrate their relative positions.

Referring now to Figs. 1 and 2, a selector switch comprises four rotary switch arms 2, 3, 4 and 5, each arm being rotatable, independently of the others, about a common axis of rotation 1. For the sake of clearness, Fig. 1 show only one switch arm 4. Each switch arm carries at its end a tubular guide 6, in which a contact support 7 is rectilinearly movable. The contact support 7 is provided with an insulating cross bar 8, carrying a pair of movable contacts 9.

The contact pair 9 of each switch arm is adapted to co-operate with any one of ten pairs of stationary contacts 11. The latter are arranged in an arc of a circle and are supported by a semi-cylindrical insulating strip 12, the axis of the cylinder coinciding with the common axis of rotation 1.

A plurality of pairs of conductors 13 are connected to a corresponding number of transmitters (not shown). A conductor system 13 is associated with each of the four switch arms 2, 3, 4 and 5, respectively. Each switch arm comprises supply conductor segments 14, which terminate at one end at the movable contact pair 9 of the switch arm and at the other end leave the switch arm in the common axis of rotation 1 and are connected to the supply conductors 13 from the transmitters. To the pairs of statoinary contacts 11 are connected double aerial supply conductors 15, providing connection to the ten transmitting aerials (not shown). In the present case, there are ten aerials and four transmitters and by means of the multiple switch, each transmitter may be connected to any one of the aerials.

The tubular guides 6 are arranged in such a manner on the switch arms 2, 3, 4 and 5 that the direction of displacement of each of the contact supports 7 extends through the shaft 1. Furthermore, the angles included between these directions and the shaft 1 are different for the various switch arms. In this manner, it is ensured that by retracting a contact support 7 from the row of stationary contacts 11 the switch arm supporting this contact support is entirely free in its rotary movement. This is clearly shown in Fig. 1. For the sake of clearness, the four switch arms are shown in a position, in which they are turned into the same plane through the shaft 1. The contact supports 7 of switch arms 2, 3 and 5 are retracted, and only contact support 7 of the switch arm 4 is in a position such that the contact pair 9 associated with the arm 4 engages a pair of stationary contacts 11. It will be evident from Fig. 2 that each of the switching arms 2, 3 and 4 is movable at will about the shaft 1 without being hampered by any of the other switch arms. Consequently, each switch arm is thus adapted after the contact support 7 of this switch arm has been retracted, to be moved opposite that pair of stationary contacts 11 connected to the aerial to which the supply conductor from the associated transmitter and connected to the switch arm is required to be connected electrically. By permitting the contact support 7 in this position of the switch arm, to move such that the contacts 9 and the stationary contacts 11 opposite thereto engage one another, the desired electrical connection is established between the supply conductor from the transmitter and the supply conductor leading to the chosen aerial.

In order to retract a contact support 7 of a switch arm from the row of stationary contacts 11 in the switch shown, a pull wire 16 passing over a roller 17 to a driving mechanism 18 on the switch arm is secured to the end of each support 7 remote from the arc 12. The driving mechanism is secured to the switch itself and will be described hereinafter with reference to Fig. 3. If a switch arm is rotated into a desired position, after the support 7 has been retracted, the contact support 7 may be moved out by means of a spring 19 (Fig. 3) and by paying out the pull wire 16. The spring 19 is housed in the tubular guide 6 and urges the contact support 7 in the direction of the contacts 11. It will be apparent that control of the contact supports may alternatively be effected by means other than a pull wire and a spring, for example, a rack co-operating with a driven gear wheel may be used.

Each switch arm comprises a driving mechanism 18 which provides both the rotary movement of the switch arm and the sliding movement of the contact support 7 carried by the switch arm. For the rotary movement, a gear rim 21 concentric with the axis 1 is secured to a stationary supporting beam 20 on which the switch arm is rotatably mounted. The gear rim 21 co-operates with a pinion 22 seated on a shaft 23 of the driving mechanism 18. Upon driving the shaft 23, the switch arm concerned comprising the mechanism 18 is rotated about shaft 1.

Figure 3:
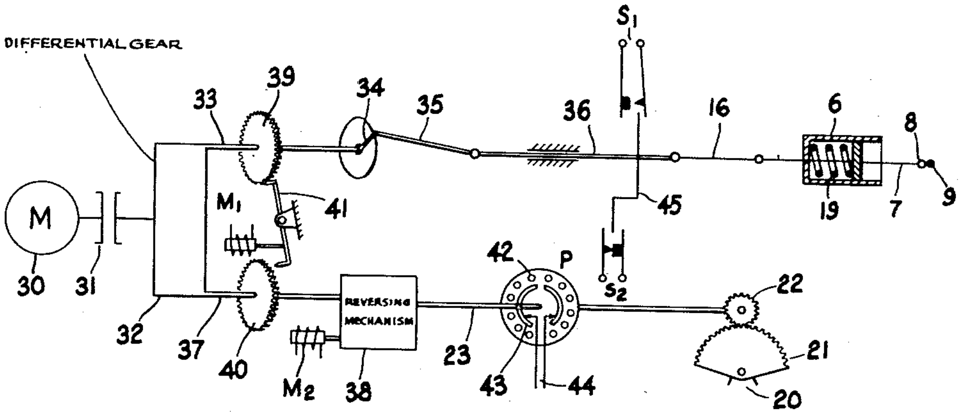
Fig. 3 shows a mechanism suitable for use in remote control of the switch arms and the contacts supported by the switch arms, only one switch arm being shown.

The driving mechanism 18 on one switch arm is shown diagrammatically in Fig. 3. An electric motor 30 drives a differential gear 32 through an overload coupling 31, for example, a slip coupling. The outlet 33 of this differential drives a mechanism 34, 35, 36 providing a reciprocating movement which is transmitted to the contact support 7 by the pull wire 16.

The outlet 37 of the differential 32 is coupled through a mechanism 38 to the shaft 23, the mechanism 38 having for its object to make the movement of the shaft 23 reversible, while the direction of rotation of the motor 30 remains the same.

The two outlets 33 and 37 of the differential 32 are provided with a ratchet wheel 39 and 40, respectively, co-operating with a pawl 41 which blocks either the outlet 33 or the outlet 37. The pawl 41 is actuated by an electromagnet $M_1$.

Figure 4:
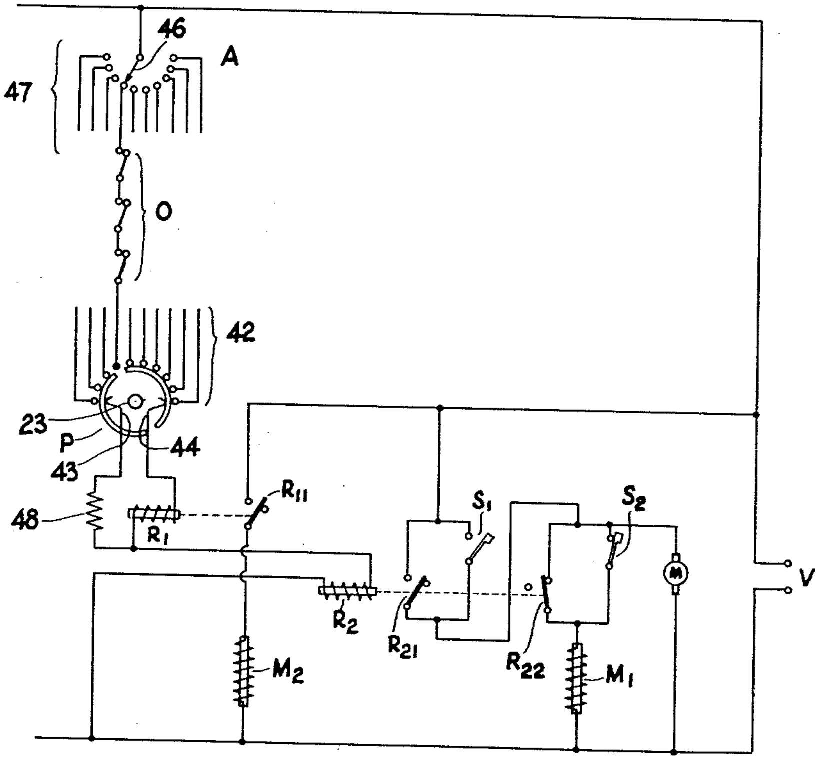
Fig. 4 shows an electrical circuit-arrangement suitable for remote control of the mechanism shown in Fig. 3.

The reversing mechanism 38 comprises an electromagnet $M_2$, which actuates a pawl (not shown) by means of which the direction of rotation of shaft 23 is reversed in a known manner. In addition to the pinion 22, the shaft 23 has secured to it a sector disc P comprising two conductive, relatively insulated substantially semi-circular collectors which co-operate at their periphery with stationary contacts 42 arranged about shaft 23 and which are electrically connected to corresponding stationary contacts of a control switch A (Fig. 4). The sliding contact 43 co-operates with one collector of the disc P and sliding contact 44 co-operates with the other collector.

The connecting rod 36 is provided with a tappet 45 which co-operates with contact switches $S_1$ and $S_2$. In the extreme position of the connecting rod in which the contact support 7 is in contact with stationary contacts 11, the tappet 45 keeps the switch $S_1$ open. In the positions more to the left i. e. when the contact support 7 is retracted from the stationary contacts 11, the tappet 45 keeps the switch $S_2$ open.

Fig. 4 shows an elecrical circuit-arrangement for remote control of the driving mechanism 18 of a switch arm.

A control-panel for an antenna selector switch is provided, for each switch arm, with a rotary switch the position of which determines the position of the switch arm. Only one of these switches, i. e. the switch A, is shown. The switch A has a switch arm 46 which is adapted to co-operate with any of a number of stationary contacts 47, the number of which corresponds with the number of positions of the switch arm controlled by switch A. Each stationary contact of the group 47 is connected, by way of a number of break contacts O, to a corresponding stationary contact of the group of contacts 42 arranged about the shaft 23 and co-operating with the sectors of the disc P. The sliding contact 43 is connected to the energising winding of a relay $R_2$, while sliding contact 44 is connected to the energising winding of a relay $R_1$. The other end of the winding of relay $R_1$ is connected to the sliding contact 43 by way of a resistance 48. The make contact 46 of the control switch A is connected to one terminal and the energizing winding of relay $R_2$ is connected to the other terminal of a voltage source V. Through this voltage source, the energising winding of the electro-magnet $M_2$ is connected in series with a make contact $R_{11}$ of relay $R_1$. The motor 30 is also connected to the voltage source V in series with switch $S_1$. Parallel to switch $S_1$ is connected the make contact $R_{21}$ of relay $R_2$. The winding of the electro-magnet $M_1$ is connected in series with the parallel-connected switches $S_2$ and $R_{22}$, the latter being a break contact of relay $R_2$. The winding $M_1$ and the switches $R_{22}$ and $S_2$ are connected in parallel with the motor 30.

The operation is as follows. If the make contact 46 of the control switch A is made to engage one of the stationary contacts 47 and if the associated switch arm, say, switch arm 4, is not in the corresponding position, the relay $R_2$ will be energized, provided the contacts O in the lead from the said contact 47 are closed. Subsequently switch $R_{21}$ is closed and the motor 30 starts. Since the electro-magnet $M_1$ is connected to the motor 30 through switch $S_2$, the pawl 41 is tilted, so that the outlet 37 of the differential 32 is locked. The connecting rod 36 is pulled back by the motor 30, which results in closing of switch $S_1$ and opening of switch $S_2$. The electro-magnet $M_1$ is then de-energized, since contact $R_{22}$ is opened upon energization of relay $R_2$. The pawl 41 is again tilted and the motor 30 drives the shaft 23 through the reversing mechanism 38, so that the switch arm 4 is rotated. The direction of rotation of shaft 23 is determined by that collector of the disc P which is in contact with the stationary contact 42 corresponding with the chosen stationary contact 47 of selector switch A. In one case, relay $R_2$ alone is energized and in the other case the two relays $R_1$ and $R_2$ are energized simultaneously. The direction of rotation of shaft 23, which varies with the energisation or de-energisation of electro-magnet $M_2$ through the make contact $R_{11}$ actuated by relay $R_1$ is thus invariably such that the switch arm 4 moves into its new position by the shortest path. On reaching the new position, the contact of the two arcuate collectors 43 of the sector disc P with that stationary contact 42 made alive by the control switch A is interrupted. Relay $R_1$ and, if energized, relay $R_2$ become de-energized. Switch $R_{22}$ is closed and switch $R_{21}$ opened. Relay $M_1$ is thus again energized, so that the pawl 41 is again tilted and locks the outlet 37 of the differential 32. However, motor 30 continues to run, since switch $S_1$ is still closed. The connecting rod 36 is moved into its initial position by the motor 30, the pull wire 16 being fed out and the contact support 7 urged towards the contacts 11. At the end of this movement, switch $S_1$ is opened by the tappet 45, so that both the motor 30 and the magnet $M_1$ are de-energized. Switch $S_2$ has been closed in the meantime, but this has no effect, since this switch was already shunted by the closed contact $R_{22}$. The switch arm 4 thus remains in its new position, and owing to the movement of the contact support 7, the desired connection between the transmitter connected to contacts 9 of the arm 4 and the aerial connected to the stationary contacts 11 chosen is established. The break contacts O serve to prevent supply conductors from different transmitters from being connected simultaneously to the same aerial, i. e. to one and the same pair of stationary contacts 11. When of a control switch, such as A, the switch arm 4 is made to engage a definite contact, a break contact O is opened electrically in the corresponding control-lead, from the contact group 47, of each of the other control switches.

If, with the use of one of the control-switches, a position of the switch arm controlled by that switch is chosen which has already been chosen by the control-switch of another switch arm, this selection has no effect, since, owing to the interruption of a contact O, the driving mechanism of the switch arm for which a position is chosen which is already occupied by another arm, remains without current.

What we claim is:

1. A multiple switch for establishing a number of simultaneous connections between two groups of conductor systems, each group having a plurality of conductor systems, the connecting of a conductor system of each group forming a single connection, said switch comprising a plurality of switch arms mounted in different planes along a common axis of rotation in one of said groups, each of said switch arms being adapted to be connected to a conductor system, a plurality of stationary contact members in the other group mounted on an arc shaped frame which frame is in a plane perpendicular to the said axis of rotation and has a center of curvature coincident with said axis of rotation, each of said stationary contact members being adapted to be connected to a conductor system, each of said switch arms having retractable contact members to engage selectively said stationary contact members, said retractable contact members being retractable in a plane which passes through the said axis of rotation, and means to retract said contacts to a position in which the switch arms may rotate freely of each other.

2. A multiple switch for establishing a number of simultaneous connections between two groups of conductor systems, each group having a plurality of conductor systems, the connecting of a conductor system of each group forming a single connection, said switch comprising a plurality of switch arms mounted in different planes along a common axis of rotation in one of said groups, each of said switch arms being adapted to be connected to a conductor system, a plurality of stationary contact members in the other group mounted on an arc-shaped frame which frame is in a plane perpendicular to the said axis of rotation and has a center of curvature coincident with said axis of rotation, each of said stationary contact members being adapted to be connected to a conductor system, each of said switch arms having retractable contact members to engage selectively said stationary contact members, the said retractable contact members being spaced from each other and each forming a different angle between the member itself and the said axis of rotation, and means to retract said retractable contacts in a plane which passes through the said axis of rotation to a position in which the switch arms may rotate freely of each other.

3. A multiple switch for establishing a number of simultaneous connections between two groups of conductor systems, each group having a plurality of conductor systems, the connecting of a conductor system of each group forming a single connection, said switch comprising a plurality of switch arms mounted in different planes along a common axis of rotation in one of said groups, each of said switch arms being adapted to be connected to a conductor system, a plurality of stationary contact members in the other group mounted on an arc-shaped frame which frame is in a plane perpendicular to the said axis of rotation and has a center of curvature coincident with said axis of rotation, each of said stationary contact members being adapted to be connected to a conductor system, each of said switch arms having retractable contact members to engage selectively said stationary contact members, spring and pull wire means to extend said retractable contact members into contact with said stationary contact members and to retract said contacts in a plane which passes through the said axis of rotation to a position in which the switch arms may rotate freely of each other, and differential gear means for both driving said pull wire and for rotating said switch arms.

4. A multiple switch for establishing a number of simultaneous connections between two groups of conductor systems, each group having a plurality of conductor systems, the connecting of a conductor system of each group forming a single connection, said switch comprising a plurality of switch arms mounted in different planes along a common axis of rotation in one of said groups, each of said switch arms being adapted to be connected to a conductor system, a plurality of stationary contact members in the other group mounted on an arc-shaped frame which frame is in a plane perpendicular to the said axis of rotation and has a center of curvature coincident with said axis of rotation, each of said stationary contact members being adapted to be connected to a conductor system, each of said switch arms having retractable contact members to engage selectively said stationary contacts members, spring and pull wire means to extend said retractable contact members into contact with said stationary contact members and to retract said contacts in a plane which passes through the said axis of rotation to a position in which the switch arms may rotate freely of each other, differential gear means for both driving said pull wire and for rotating said switch arms, and pawl and ratchet means for preventing rotary movement of the switch arm so long as the retractable contact member of the switch arm is in an extended position.

5. A multiple switch for establishing a number of simultaneous connections between two groups of conductor systems, each group having a plurality of conductor systems, the connecting of a conductor system of each group forming a single connection, said switch comprising a plurality of switch arms mounted in different planes along a common axis of rotation in one of said groups, each of said switch arms being adapted to be connected to a conductor system, a plurality of stationary contact members in the other group mounted on an arc-shaped frame which frame is in a plane perpendicular to the said axis of rotation and has a center of curvature coincident with said axis of rotation, each of said stationary contact members being adapted to be connected to a conductor system, each of said switch arms having retractable contact members to engage selectively said stationary contact members, spring and pull-wire means to extend said retractable contact members into contact with said stationary contact members and to retract said contacts in a plane which extends through the said axis of rotation to a position in which the switch arms may rotate freely of each other, motor means, first and second shaft means for driving said pull-wire means and for rotating said switch arms respectively, differential gear means driven by said motor means for driving both said first and second shaft means, a ratchet wheel secured to each of said shafts, pawl means common to both ratchet wheels, means to cause said switch arms to rotate to a pre-selected position while said pawl holds the first shaft stationary and sequentially operated electromagnetic means to tilt said pawl to free said first shaft and hold said second shaft stationary so that said first shaft is held stationary while said second shaft is rotated and said second shaft is held stationary while said first shaft is rotated.

References Cited in the file of this patent

UNITED STATES PATENTS

| Number | Name | Date |
|---|---|---|
| 2,224,277 | Talley | Dec. 10, 1940 |
| 2,516,606 | Weaver et al. | July 25, 1950 |

FOREIGN PATENTS

| Number | Country | Date |
|---|---|---|
| 673,295 | Great Britain | June 4, 1952 |